United States Patent
Vermande et al.

(10) Patent No.: US 9,807,670 B2
(45) Date of Patent: Oct. 31, 2017

(54) METHOD AND SYSTEM FOR TRANSMITTING DATA IN A NETWORK OF AIRCRAFT IN FLIGHT

(71) Applicants: Airbus Operations (S.A.S.), Toulouse (FR); Airbus (S.A.S.), Blagnac (FR)

(72) Inventors: Severine Vermande, Blagnac (FR); Fabrice Vermande, Toulouse (FR); Etienne Maynier, Toulouse (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 0 days.

(21) Appl. No.: 13/828,378

(22) Filed: Mar. 14, 2013

(65) Prior Publication Data

US 2013/0242864 A1 Sep. 19, 2013

(30) Foreign Application Priority Data

Mar. 16, 2012 (FR) ...................................... 12 52419

(51) Int. Cl.
*H04W 40/20* (2009.01)
*H04B 7/185* (2006.01)

(52) U.S. Cl.
CPC ........ *H04W 40/20* (2013.01); *H04B 7/18506* (2013.01)

(58) Field of Classification Search
CPC .................................................. H04W 40/20
USPC ............................................... 455/11.1, 12.1
See application file for complete search history.

(56) References Cited

U.S. PATENT DOCUMENTS

| | | | |
|---|---|---|---|
| 5,530,909 A | 6/1996 | Simon et al. | |
| 6,285,878 B1 | 9/2001 | Lai | |
| 2005/0090201 A1* | 4/2005 | Lengies et al. | 455/41.2 |
| 2005/0288031 A1* | 12/2005 | Davis | H04W 40/06 455/452.1 |
| 2009/0092074 A1* | 4/2009 | Jamalipour et al. | 370/316 |
| 2009/0103473 A1* | 4/2009 | Foster | H04B 7/18584 370/316 |
| 2010/0246492 A1* | 9/2010 | Scarlatti et al. | 370/328 |
| 2011/0149849 A1* | 6/2011 | Brownrig | H04L 45/00 370/328 |

FOREIGN PATENT DOCUMENTS

| | | |
|---|---|---|
| EP | 0618704 A1 | 10/1994 |
| EP | 2051406 A2 | 4/2009 |

(Continued)

OTHER PUBLICATIONS

French Search Report for Application No. 1252419 dated Oct. 22, 2012.

*Primary Examiner* — Charles Appiah
*Assistant Examiner* — Margaret G Mastrodonato
(74) *Attorney, Agent, or Firm* — Jenkins, Wilson, Taylor & Hunt, P.A.

(57) ABSTRACT

In a communications network including aircraft in flight and at least one ground station, which constitute communication nodes of the network, data are transmitted from a source node to a destination node following a non-predetermined path through the network that includes at least one node which is a so-called intermediate aircraft. Before transmitting data from a transmitting node to at least one receiving node, it envisages a step of selecting the receiving node defining a portion of the path without knowledge of the next portion of the path.

17 Claims, 5 Drawing Sheets

(56) References Cited

FOREIGN PATENT DOCUMENTS

| EP | 2086279 A1 | 8/2009 |
|----|------------|--------|
| EP | 2237614 A1 | 10/2010 |
| WO | WO-2007/059560 A1 | 5/2007 |

* cited by examiner

METHOD AND SYSTEM FOR TRANSMITTING DATA IN A NETWORK OF AIRCRAFT IN FLIGHT

CROSS-REFERENCE TO RELATED APPLICATION

This application claims priority to and the benefit of French Patent Application Serial No. FR 1252419, filed Mar. 16, 2012, the disclosure of which is incorporated by reference herein in its entirety.

TECHNICAL FIELD

The invention relates to a method for transmitting and receiving data in a communications network comprising aircraft in flight. The data in question can for example originating from a black box on board an aircraft.

BACKGROUND

A black box, also called flight recorder, is a device mounted on board aircraft, which stores various flight data during the flight, and/or audio data (such as discussions between members of the crew) and/or optionally, visual data such as videos and/or images. The flight data originates from various sensors present on board the aircraft, which collect various flight data, and computers that supply flight parameters and maintenance data of the various on-board systems and equipment.

These black boxes are generally orange in colour and are equipped with a radio transmitter so that they can be located more easily, for example after a crash.

However, it is found that recovery of these black boxes following a crash is difficult, in particular because by far the greater part of the earth's surface has an irregular topology.

In fact, it is difficult to recover black boxes from the bottom of the oceans or from crevasses in mountain ranges.

However, the data contained in these devices are important for finding out the causes of an air disaster and for working to rectify the cause in order to prevent the same kind of disaster being repeated.

Moreover, other types of data present on board aircraft in flight would be useful for personnel in ground facilities. There is therefore felt to be a need for a reliable solution enabling said personnel to have access to data relating to an aircraft in flight, such as, but not exclusively, black box data.

SUMMARY

According to a first aspect, the invention relates to a method for data transmission in a communications network comprising aircraft in flight and at least one ground station, which constitute communication nodes of the network, the method comprising the transmission of data from a source node to a destination node following a non-predetermined path through an aerial part of the network and which comprises at least one so-called intermediate node which is a so-called intermediate aircraft. Before transmitting data from a transmitting node to at least one receiving node, a step of selection of the receiving node is provided defining a portion of said path without knowledge of the next portion of said path.

Thus, data are transmitted from a source node to said at least one intermediate node or aircraft, which in its turn retransmits the data to the destination node.

Moreover, selection of a new intermediate node (the aforementioned receiving node), which defines a portion of the non-predetermined path from the node (transmitter, performing the selection), is carried out without knowledge of the next portion of the path, i.e. without taking into account the set of subsequent jumps to the destination node.

Thus, communication to an available aircraft (selected node) is favoured relative to finding and determining the subsequent path to the destination node, which is advantageous for example in the case of the aforementioned black boxes.

The intermediate aircraft (or each intermediate aircraft if there are several) is not known in advance and therefore is not predetermined for receiving data from the source node. This source node can be a transmitting aircraft of the network (source or intermediate aircraft) and the destination node can then be a ground station. Alternatively, the source node can be a ground station and the destination node an aircraft. In the latter case the ground station can for example transmit a request to a given aircraft via one or more intermediate aircraft that form a non-predetermined path.

Thus, the destination of the data (destination node) is known in advance of the source node but not the path, which is established dynamically, as a function of the configuration of the aircraft in flight, which changes from one moment to the next.

According to a possible feature, the transmission of data is carried out by non-predetermined jumps from transmitting node to receiving node. It can thus be jumps from aircraft to aircraft, a jump from an aircraft to a ground station as well as a jump from a ground station to an aircraft.

The jumps (also called "steps") from aircraft to aircraft within the network are not known in advance, and when a jump is decided from a transmitting aircraft to a receiving aircraft, the transmitting aircraft does not know to which aircraft the data will then be transmitted after being received by the receiving aircraft. It therefore does not know the path that the data will follow. Moreover, the path is not known beforehand by anyone. In fact, the aircraft receiving the data does not know either, in advance, to which aircraft it will then transmit the data.

The transmission of data is thus set up dynamically per jump of the data to an aircraft that was not known during the preceding jump. Thus, the network of aircraft in flight is reconfigured dynamically since the aircraft are constantly in motion and change position relative to one other at any moment.

By breaking down the transmission into transmission steps or jumps in this way, the risks of data loss are reduced since connection is only established between a transmitting aircraft and a receiving aircraft after selecting the receiving aircraft without taking into account the subsequent path that the data might take.

Moreover, not fixing in advance the receiving aircraft and therefore not fixing the path that the data will follow to reach the destination node ensures great flexibility and great simplicity for the mechanism of transmission.

Thus, the data, for example originating from a black box or flight recorder of a source aircraft (source node), are transmitted during the flight outside of the aircraft in question. This thus makes it possible to ensure that these data will be accessible (as they are backed up in another aircraft) in the event of an air disaster involving this aircraft and if the black box could not be recovered or is unreadable. In the solution proposed here, this is not dependent on the existence and determination of a path to the destination node.

In general, the transmission of said data by jump between two aircraft can be carried out permanently depending on the possible communication connections or intermittently, regularly or not, automatically or after being triggered manually in an emergency by a member of the crew.

It should be noted that the source aircraft can, depending on the circumstances (for example, in alert mode), transmit black box data to several aircraft and not to just one, in order to increase the chances of reliably transmitting, and therefore backing up said data.

Transmitting the data to a receiving aircraft that is not a predetermined aircraft makes it possible to ensure that the data can be transmitted at any moment (by selecting an aircraft at the moment when this is necessary) and regardless of the geographical zone being overflown.

Thus, the invention makes it possible to transmit the data (for example from black box/boxes) and back them up even if the zone overflown is not covered by satellite.

Moreover, other data can be transmitted with or in place of black box data, for example, depending on the circumstances and the applications envisaged. By way of example, these other data can be data relating to the maintenance of the aircraft, or even data relating to video surveillance, to telemedicine, to the flow of passengers and Internet data. It should be noted that weather or navigation data can be sent from the ground.

According to a possible feature, the transmission of data is carried out by radio frequency, for example via a mobile telephony network, or by WiMAX, or using the K bands.

The transmission of data could also be carried out by another means of wireless communication such as a satellite means, for example. During a transmission by satellite, the data are received directly by a ground station, which constitutes what will be called hereinafter: control centre.

According to a possible feature, for their transmission the data use a bandwidth of at least 100 kbits/s.

In fact, said bandwidth is preferable for transmitting flight data and audio data recorded in the cockpit.

In the case of transmission of video data or images, a bandwidth of at least 2 Mbits/s is preferable.

According to a possible feature, the method comprises a step of encryption of the data to be transmitted in order to make these data unreadable at least to the node or nodes (aircraft) that serve as transmission relay for said encrypted data.

This step aims to guarantee confidentiality and integrity of the data that will be transmitted between two consecutive nodes (aircraft) of the network and, more generally, end to end, i.e. from the transmitting aircraft to the ground.

Thus, only authorized entities possessing appropriate decrypting means are able to understand the data transmitted.

The receiving aircraft, which serves solely as a transmission relay for the encrypted data, is not generally regarded as an entity authorized to read these data and, accordingly, therefore does not have appropriate decrypting means.

Thus, bandwidth can be freed up on the network to permit the establishment of other communications or for transmitting a larger volume of data.

According to a possible feature, the communications network comprises a plurality of ground stations.

These stations are generally arranged in different geographical zones and can be used depending on the geographical proximity of a station relative to an aircraft that is potentially a receiver of data in the network.

A ground station can be a control centre or a gateway. A gateway is a node of the network that permits communication between the aerial part of the network and the terrestrial part of said network.

In this instance, a gateway is for example located in an airport, and has a means of communication making it possible to communicate with the aircraft that are within communication range and also possessing a communication link with the network on the ground.

According to a possible feature, the source node is a so-called source aircraft and the destination node is a ground station. This station is known at the moment of transmission of the data via the intermediate node or nodes (intermediate aircraft) of the network, whereas the path that will be taken by the data is not known. This path will be established progressively with the jumps from transmitting node to receiving node.

According to a possible feature, the method comprises, prior to transmission, a step of selecting a ground station from the plurality of ground stations for transmitting the data from the source aircraft to the ground station selected, via at least one intermediate aircraft of the network, following a non-predetermined path through the network.

According to a possible feature, selection of a ground station comprises selection of a control centre authorized to store the data that will be transmitted by the source aircraft.

Only this control centre (recipient of the data) is authorized to receive the data for storing and, optionally, for using them there.

According to another possible feature, a control centre is selected from a predetermined list of control centres that is present on board the source aircraft.

According to a possible feature, selection of a ground station also comprises selection of a ground gateway intended to receive the data from the source aircraft and to transmit said data to the control centre selected.

Thus, after selecting a control centre as the destination of the data to be transmitted, a ground gateway is selected.

A criterion or a method of selection can be applied as described below.

According to a possible feature, a ground gateway is selected by one of the following methods:
- from a predetermined list of ground gateways that is present on board the source aircraft,
- by receiving information originating from ground gateways and signalling the presence of said ground gateways,
- by broadcasting a message for finding ground gateways intended for the aircraft in flight.

It should be noted that several of the methods listed above can be combined in order to enrich the list of ground stations.

This also makes it possible to improve the effectiveness of transmission of data from the source aircraft to the selected ground station from one or more intermediate aircraft of the network. In fact, with a larger possible choice of ground gateways, selection of a gateway can be facilitated and made more reliable because several selection criteria are taken into account.

According to a possible feature, selection of a ground station from the plurality of ground stations comprises selection of the ground gateway that is the nearest geographically to the source aircraft.

Selecting said ground gateway (number of limited jumps for reaching the ground) can make the transmission of data from the source aircraft to this gateway easier and quicker.

However, other selection criteria can be adopted in order to make the transmission of the data from the source aircraft to the ground reliable.

According to a possible feature, the source node is a ground station and the destination node is an aircraft that is the recipient of the data.

According to a possible feature, before each transmission of data from a transmitting node to a receiving node that is not known in advance, the method comprises a step of selecting at least one receiving node as a function of at least one predetermined criterion.

In general, said selection aims to determine for example the "best" node, i.e. the node that is the most appropriate, at a given moment, with respect to the selection criterion or criteria applied.

This selection aims for example to select at least one receiving aircraft from a transmitting aircraft (selection in flight) or from a ground station.

Selection of at least one receiving aircraft makes it possible to ensure that there will always be an aircraft within communication range of the transmitting aircraft so as to be able to transmit the data in question to it, regardless of the moment in time and regardless of the geographical zone being overflown, and without taking into account the subsequent path that the data might take.

According to a possible feature, with a receiving aircraft as the receiving node, said at least one predetermined criterion (for the selection of at least one receiving aircraft) comprises at least one of the following criteria: aircraft which is/are located in the direction of the ground station selected (which generally makes it possible to transmit data to the ground with a minimum of transmission jumps from transmitting node to receiving node, but without having to take into account the jumps envisaged), path followed by an aircraft, load of an aircraft in terms of communication, behaviour of a receiving aircraft, aircraft from which the signal/noise ratio (signal quality) is above a predetermined threshold, aircraft having similar or identical flight plans (for maximizing the time of availability of the receiving aircraft), aircraft belonging to the same airline or to the same group combining several airlines, aircraft from the same manufacturer, aircraft within communication range, aircraft farthest from the first aircraft (to reduce the relative motion between the transmitting aircraft and the receiving aircraft), aircraft in the descent phase.

These criteria are from different categories. Certain criteria for example relate to communication between the aircraft (signal/noise ratio, aircraft flying in the same direction, aircraft within communication range, etc.), while others are non-technical (aircraft of the same airline, from the same manufacturer, etc.).

The aircraft most appropriate among the aircraft of the network is/are for example identified on the basis of the signal/noise ratio originating from the aircraft, favouring for example the maximum signal/noise ratio or ratios.

Alternatively, as a function of the direction of the aircraft in question, preference can be given to the aircraft that will remain longest in the field (within communication range) of the aircraft in question (aircraft going in the same direction).

It should be noted that the predetermined criterion or criteria for selection of one or several receiving aircraft take into account the location of said receiving aircraft relative to the ground station previously selected.

Thus, the transmission of the data from the source aircraft to the ground station identified is made reliable and effective.

The invention also relates to a data transmission system in a communications network comprising aircraft in flight and at least one ground station, which constitute nodes of the network, a source node holding data to be transmitted to a destination node, the system comprising suitable transmitting means for transmitting said data following a non-predetermined path through an aerial part of the network and that comprises at least one so-called intermediate node, which is a so-called intermediate aircraft, and means for selecting, before transmitting data from a transmitting node to at least one receiving node, the receiving node defining a portion of said path without knowledge of the next portion of said path.

The transmission system can comprise, in the form of corresponding means, one or more features of the method presented above, or even all of these features, and benefits from the same advantages.

Some of these features are examined below in the form of system characteristics.

According to a possible feature, the suitable means of the system are distributed in the network, in particular in the source node (e.g. the source aircraft), and in said at least one intermediate aircraft.

These means can ensure transmission of the data from the source node to the destination node via the intermediate aircraft that gradually establishes or establish the path by portions of path defined between two nodes. They are thus means that make it possible to select in flight at least one receiving node (intermediate aircraft) as a function of at least one predetermined criterion as already described above in relation to the method and then transmit data by jumps from transmitting aircraft to receiving aircraft.

They are in particular means making it possible to transmit and receive data, for example at radio frequencies. Such means include means for asking to establish a connection between a transmitting aircraft and a receiving aircraft.

According to a possible feature, the means of transmission are suitable for transmitting the data by non-predetermined jumps from transmitting node to receiving node.

These jumps that are not known in advance by the source node define, at the moment when each of them is known, a portion of path in the network whereas the next portion of path is not yet known or established.

According to a possible feature, the source node is a so-called source aircraft and the destination node is a ground station. According to a possible feature, the suitable transmitting means of the system comprise means for selecting, as a function of at least one predetermined criterion, at least one receiving node (e.g. aircraft), which is not known in advance.

The receiving aircraft is thus selected by suitable means present in the transmitting node (e.g. the aircraft) when the latter has received the data originating from a preceding transmitting aircraft or when the transmitting node is the source node. The selection is carried out according to at least one predetermined criterion as briefly presented above in relation to the method, without taking into account the subsequent path through the network of aircraft, i.e. without determining which aircraft can form the next part of the path to the destination node.

According to a possible feature, the network comprises a plurality of ground stations that constitute nodes of the network.

According to a possible feature, the system comprises means for selecting a ground station from the plurality of ground stations with a view to transmitting the data from the source aircraft (source node) to the ground station selected via at least one intermediate aircraft of the network following a non-predetermined path through the network.

For this purpose, the selecting means are partly present on board the transmitting aircraft (for example the source aircraft at the start of the transmission or an intermediate aircraft in the course of transmission on the network) and partly in ground stations and/or in other aircraft of the network in flight.

However, these means may only be present on board the transmitting aircraft when it is a matter of selecting a ground station from a predetermined list of ground stations present on board the aircraft.

According to another aspect, the invention relates to a communications network comprising aircraft in flight and a data transmission system in said network such as briefly described above.

BRIEF DESCRIPTION OF THE DRAWINGS

Other features and advantages will become clear from the description given below, purely as non-limitative examples and referring to the appended drawings, where.

DETAILED DESCRIPTION

Figure 1:
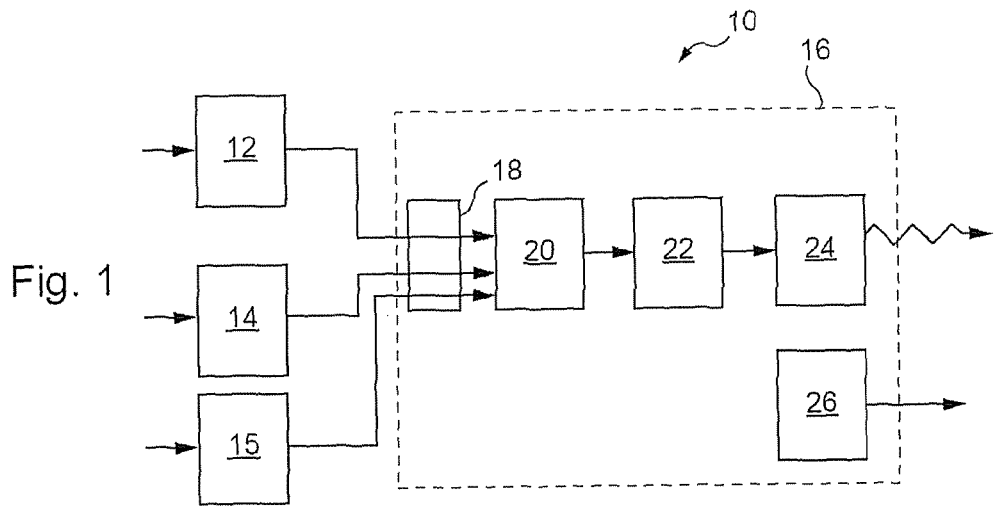
FIG. 1 is a general diagrammatic view of a device according to an embodiment of the invention.

As shown in a general way in FIG. 1 and denoted by the reference number 10, a device according to the invention on board an aircraft comprises two black boxes or recorders 12 and 14, one storing a set of data from various computers on board the aircraft and which are for example flight data (data reflecting the behaviour of the aircraft in flight), and the other storing audio data recorded in the cockpit. It should be noted that the aforementioned data can be distributed differently between the two black boxes and that other types of data can be stored in one and/or other of these boxes such as video data recorded in the cockpit and in the environment of the aircraft. In the rest of the description, when reference is made to one and/or other of the black boxes 12 and 14, it is understood that this can apply to a different number of black boxes and to any type of data.

Moreover, according to a variant, the data originating from one and/or other of the black boxes can correspond to the set of data stored in each of them or to a selection of these data.

The aircraft considered here is an aircraft referred to as the source aircraft and the data that will be transmitted originate from this aircraft.

The device 10 further comprises a data transmission unit 16.

It should be noted that other types of data originating from other sources of data represented in FIG. 1 by the source 15 can also be transferred to unit 16 in addition to or instead of the black box data.

These other types of data include video surveillance, telemedicine, passenger-flow, Internet data, etc.

Unit 16 comprises means 18 for encryption of the data that are intended to be transmitted outside of the aircraft and that originate from one or both black boxes 12, 14.

Data encryption has the aim of guaranteeing the confidentiality and integrity of the data that are to be transmitted. In particular, these data will be transmitted to another aircraft, called the receiving aircraft, and they must only be readable by a duly authorized entity or by a collection of authorized entities. For this purpose, encryption has the effect of making the data unintelligible for the aircraft receiving said data, which only serve as data transmission relays, from aircraft to aircraft, and then to the ground. Only one entity, for example located in a ground station, is authorized to have knowledge of the data transmitted.

Encryption is carried out for example by means of the public key of a public key and private key system, the use of the private key possessed by each of the entities involved (transmitter and receiver authorized to have knowledge of the data) being necessary for decryption.

For example, a control centre can constitute an entity authorized to have knowledge of the data. For this purpose, the control centre holds the private key.

It should be noted that threshold schemes can also be used to ensure greater confidentiality of the data. The principle of the threshold scheme is that several entities authorized to decrypt the data share the decryption key: thus, the entities will all have to be in agreement in order to carry out decryption.

Unit 16 optionally comprises means for preliminary processing of the data originating from one and/or other of the black boxes 12 and 14.

Means for data selection can for example form part of the means 18.

It should be noted that the optional processing means ensure for example optimization of the volume of the data in order to reduce the bandwidth used for their transmission.

Unit 16 also comprises a physical storage medium 20 (for example, a magnetic medium) which can be a buffer memory area or a storage space on a hard disk.

The data originating from one and/or other of the black boxes and/or from the source 15, previously encrypted, are stored in the separate intermediate storage space 20.

Unit 16 also comprises means 22 for processing the data (for example: microprocessor, dedicated electronic circuit, programmable component of the FPGA type) originating from the storage space 20.

This processing can perform several functions.

Firstly, this processing makes it possible to shape the data in the form of a data frame.

This shaping consists, for example, of structuring the data in the form of a signal comprising one or more headers and a signal body containing the useful data.

The processing can also comprise an error detection system.

Unit 16 also comprises data transmission means 24. These means use a communication procedure between a transmitting aircraft and a receiving aircraft which is connected to the communication protocol selected for the means of communication used. This procedure established between the two aircraft can make the signal transmitted more robust in that it ensures error detection: packet not arrived at destination, loss of integrity of the packet, etc. Thus, the packet can be retransmitted if an error is detected.

As an example, the effective unidirectional (non-satellite) bandwidth between two aircraft is 2 Mbits/s.

Unit 16 further comprises means 26 for making it possible to establish one or more connections between the aircraft comprising device 10 and one or more aircraft in flight.

The aircraft in flight constitute mobile nodes of an ad-hoc aeronautical communications network.

An ad-hoc aeronautical network is an autonomous radio network of aircraft in flight which makes it possible to carry out aircraft-to-aircraft and aircraft-to-ground communications using intermediate aircraft as relays. The aircraft or communication nodes are alternately transmitter and receiver.

Figure 2:
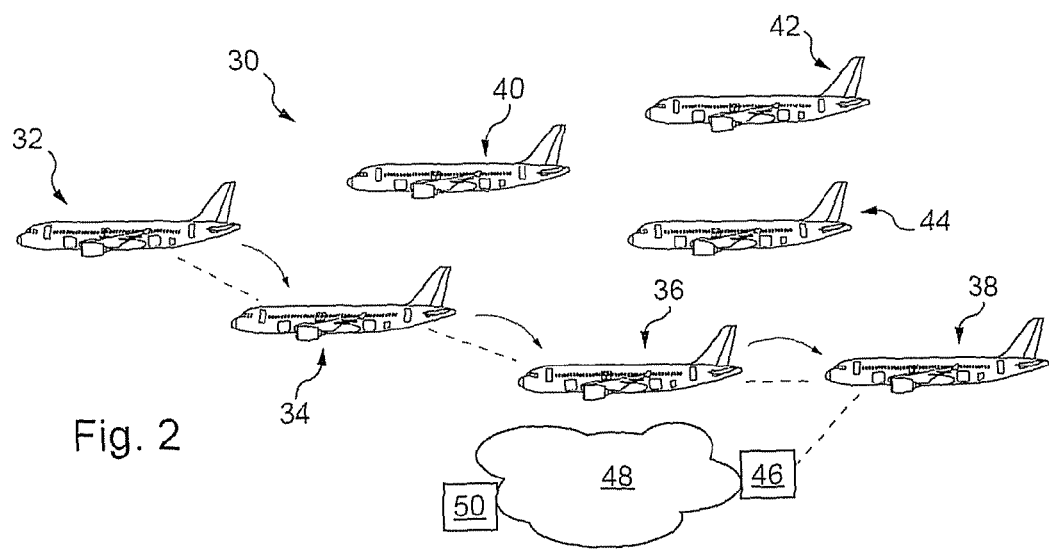
FIG. 2 is a diagrammatic view showing several aircraft constituting mobile nodes of a communications network.

FIG. 2 diagrammatically illustrates a network of aircraft in flight 30 comprising several mobile nodes 32, 34, 36, 38, 40, 42, 44 of such a communications network. This network has a topology or configuration that evolves dynamically over time, in that the aircraft in flight change position at any moment. Such a network can include the world fleet of aircraft in flight at a given moment or only some of them (for example the aircraft of one and the same company, of one and the same commercial group or of one and the same manufacturer).

In this figure, the aircraft represented by mobile node 32 (source node) corresponds to the source aircraft comprising device 10 from FIG. 1.

The network of the aircraft 30 constitutes the aerial part of a network that is also deployed on the ground through a ground network.

A ground station 46 is a node of the network (gateway) permitting communication between the aerial part 30 of the network and the terrestrial part 48 of the network. There is a plurality of ground stations such as station 46, which are distributed geographically over the earth's surface. These stations can be control centres or can be gateways; these gateways are capable of communicating with control centres. As a variant, the ground station can be a maritime station, such as a buoy station or a ship. An atmospheric station (located at altitude between the altitude of the aircraft in flight and that of the ground) can also perform the role of ground station.

In the example shown in FIG. 2, station 46 is a gateway for example located in an airport and has a means of communication with the aircraft that are within communication range as well as a link to the ground network 48.

A control centre is, for its part, a site that comprises suitable means for receiving and storing information originating from the aircraft (in addition to the data that are to be transmitted via the aerial network in order to ensure that they are backed up, such as the black box data) and concerning the latter, their position and the status of the on-board systems.

In contrast to a gateway, which can only transmit and receive information/data, a control centre is capable of establishing and transmitting requests and/or information to one or more aircraft via the aeronautical network 30 and of receiving, via this same network, and processing any replies to the requests from the latter.

In the example in FIG. 2, a control centre 50 communicates with the gateway 46 via the ground network 48 and will be capable of receiving data from the gateway 46 originating from the aerial network 30.

It should be noted that the control centre 50 can, in turn, transmit data to the gateway 46 for transmission in the aerial network 30 or directly in network 30.

Figure 3:
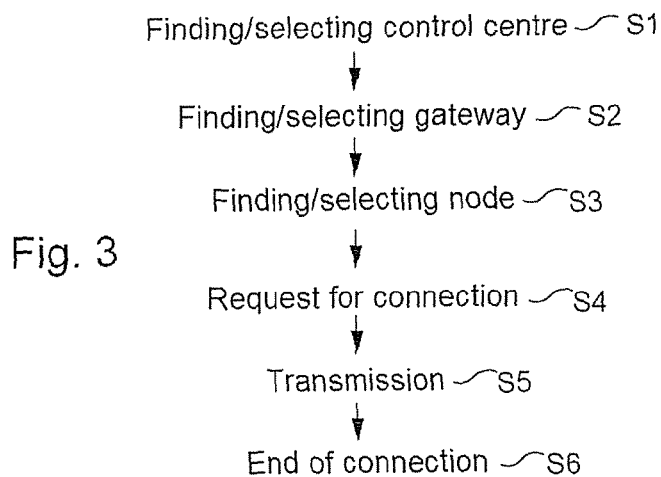
FIG. 3 is a general algorithm for establishment of a connection between two aircraft.

FIG. 3 illustrates a mechanism for establishing a connection between the aircraft 32 and one of the aircraft of the aerial network 30 from FIG. 2 with a view to transmitting data from the aircraft 32 to the ground station 46 via the network 30.

It should be noted that the algorithm is implemented by the means in FIG. 1 and in particular by the means 26 for management of communication, which will in particular put in place a phase of discovery of the topology of the communications network of which the aircraft 32 forms a part.

As shown in FIG. 3, the underlying algorithm of this mechanism comprises a first step S1 of finding/selecting a ground station as destination node. In this case, it is a matter of finding and selecting a destination control centre where the data originating from the aircraft 32 will be received and stored, or even used.

Such a ground station (control centre) is determined from a predetermined list of control centres (e.g. centres that are accredited/authorized by the airline) that is present on board the source aircraft 32.

The control centre 50 is thus selected as the destination node of the data.

When this control centre 50 is not connected directly to the aerial part of the network and it is necessary to use the ground network 48, the next step S2 provides for finding and selecting a ground station as gateway in order to gain access to the ground network 48 and then convey the data to the control centre 50.

Several methods can be envisaged for detecting the ground gateways that are present in the network:

using, on board the source aircraft, a predetermined list of the ground gateways (it can be all the existing ground gateways or only some, which may or may not be assigned a level of priority or preference);

receiving, from the existing ground gateways or from only some, regular signalling from each of them indicating its presence and its position (proactive method);

broadcasting, by the source aircraft, a message for finding a ground gateway or gateways to aircraft in flight of the network and receiving in response information on the presence and the position of one or more ground gateways.

The ground gateway that is selected is for example the one geographically nearest to the source aircraft.

Alternatively, the ground gateway adopted is selected on the basis of another predetermined criterion such as the proximity of the previously selected control centre relative to the gateway.

Other selection criteria can alternatively be envisaged, such as the probability that there is a route depending on the flight plans of the aircraft, a ground station that constitutes a main base for an airline etc.

During this search step, the type of communications network that is used for transmission is selected from the various existing means of communication, namely a radio communications network (wide, cost-free bandwidth of the means of communication), an optical communications network, or a wireless communications network of another type, or even a satellite communications network. If there is no means of communication to another possible aircraft, communication by satellite to a ground station can be envisaged (in the case of interrogation from the ground for example). The data are then received directly by a control centre or by a gateway linked to the control centre that initiated the interrogation.

Selection of the best physical layer (such as radio, optical or laser) is carried out, for example, in the software the algorithm of which is shown in FIG. 3. An order of preference of the physical layer for example is defined. For example, while radio frequency communication is available (i.e. while nodes are within range and available for communication) this support is selected, otherwise the 4G network is selected, or otherwise the satellite network.

Once a ground gateway has been selected (gateway 46) in step S2, a step S3 of finding/selecting an aircraft (intermediate aircraft) of network 30 is carried out. This step is carried out as a function of at least one predetermined criterion. This step comprises a first substep of finding aircraft that are within communication range and a second substep of selecting an aircraft (best communication pair).

For finding aircraft (nodes) within communication range (for example radio), a means of communication that can have a relatively small bandwidth is used as there are no useful data to transmit, only information about presence.

It should be noted that it is possible to separate the means of communication used for controlling the communication (opening, closing, detecting the nodes) from the means of communication used for high-rate data transfer.

This means allows a rapid sweep of 360° around the transmitting aircraft, also rapidly obtaining information about presence. By this means, the list of all pairs within communication range is obtained. The next substep consists of selecting the pair that is best placed for the given communication.

The algorithm implemented in the embodiment example functions by giving priority to the node that is located in the direction of the selected ground gateway 46. If several nodes are in the same direction as the gateway 46, it is possible to give preference to the node that has the smallest relative movement, i.e. the node that is in the same direction as the transmitter. Thus, this makes it possible to obtain a greater probability that the communication can last for the longest possible time with the same pair without loss of connectivity.

The algorithm in FIG. 3 comprises a step S4 requesting connection to the previously selected node.

This request for establishment of a connection has the aim of informing the future receiving node that the transmitting node wishes to transmit information.

When the node receiving this request for connection accepts it, depending on conditions relating to said node (the node is not for example already in active connection with this aircraft or with another aircraft, one or more storage spaces are available in the receiving node, etc.), the connection is established. The step of transmission of the data from the transmitting aircraft 32 (source aircraft), for example, to the aircraft 34 accepting the connection is then carried out (step S5).

The algorithm implemented in the source aircraft 32 is terminated by step S6, which ends the connection.

It should be noted that during selection of a new, better receiving node, two options can be envisaged:
the first option consists of replacing one of the worst still-active connections to the aircraft 32 with a connection to the new node that has just been identified;
the second option consists of keeping this new, better node as a standby node, and connection with the latter will only be made after loss of existing communication with a so-called current node.

The means 26 of the device in FIG. 1 comprise more particularly submeans for finding/selecting a ground station (control centre and gateway), submeans for finding/selecting a communication node, and submeans for establishing a connection and for disconnection.

Figure 4:
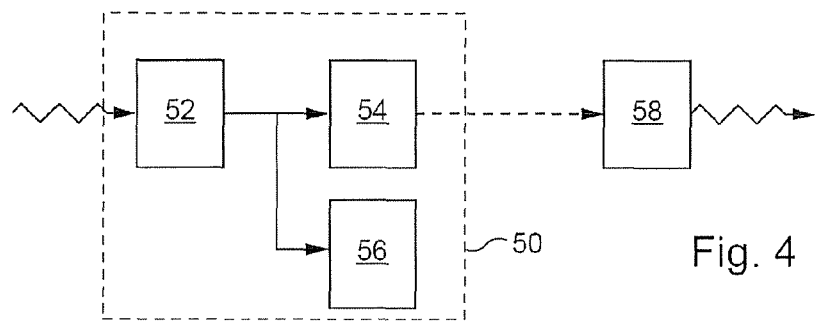
FIG. 4 is a general diagram illustrating a receiving device according to an embodiment of the invention.

FIG. 4 diagrammatically illustrates a data receiving device 50 on board an aircraft. The aircraft in question is for example the aircraft 34 mentioned above that is the best candidate for recovering data from recorder(s) or from the black box/boxes of the aircraft 32, taking into account the selection criterion adopted (for example: receiving aircraft located in the direction of station 46 or aircraft having the same path as that of the source aircraft).

The device 50 comprises means 52 for receiving the data transmitted by the aircraft 32, which are for example radio, optical or laser receiving means depending on the physical communication link used.

The device 50 also comprises a back-up storage space 54 and a reserved storage space 56 for the case where space 54 is unavailable. The data received are then stored in the appropriate space.

It should be noted that the aircraft 34 comprises the same means as those in FIG. 1, which makes it possible, if permitted by the type of communication (bidirectional communication), for the aircraft 34 to transmit its data to the aircraft 32.

The data received from the source aircraft 32 will be retransmitted by the aircraft 34 to another intermediate aircraft, and so on, by jumps that are not known in advance, from transmitting aircraft to receiving aircraft, until a so-called final aircraft is reached, which is the nearest geographically to the ground gateway selected 46.

For this purpose, the routing protocol and algorithm allow an aircraft receiving data to retransmit said data to the destination gateway or, by default, to a node that is able to reach this destination node.

The routing protocol meets the following criteria:
relatively little traffic due to routing;
capacity for management of a large number of nodes;
management of the highly dynamic topology.

The routing algorithms conventionally implemented in terrestrial networks are based on the address of the destination machine for selecting the next node but this type of routing is not suitable for an ad-hoc aeronautical network where the number of nodes is very high, where the topology of the network is constantly changing and where a node does not know in advance either the identity or the address of the nodes with which it will be able to communicate. For example, in this case geographic routing is used, according to which the next node is selected in the direction of the destination gateway previously selected by the source aircraft (as explained in step S2 of the algorithm in FIG. 3).

For this purpose, it is for example possible to select the next node as a function of the path followed by this node (this path can be measured on the basis of the Doppler effect or by having recourse to a table of the flight plans).

Alternatively, for selecting the next node, several criteria can be chosen, including:
aircraft from which a signal/noise ratio (signal quality) above a predetermined threshold originates;
aircraft having similar or identical flight plans (for maximum time of availability of the receiving aircraft);
aircraft belonging to the same airline or to one and the same group combining several airlines;
aircraft from the same manufacturer, aircraft within communication range;
aircraft farthest from the first aircraft (to reduce the relative motion between the transmitting aircraft and the receiving aircraft), aircraft in the descent phase;
communication load of a node (in order to avoid congestion during data transmission);
reputation of a node (this reputation can be obtained from a measurement based on the behaviour of the node for appraising its validity).

Once the next node has been selected, i.e. in this case for example the intermediate node or the aircraft 36, the data are transmitted by a "jump" from the transmitting aircraft 34 to the receiving aircraft 36.

The aircraft 36 is itself also equipped with a data receiving device such as that shown in FIG. 4 and described above.

It should be noted that during routing of a data packet, in the case where there is no priority assigned to the transmission, when an intermediate aircraft having received the data from a transmitting aircraft or itself having its own data to transmit loses connectivity, it then stores the data in its back-up storage space or in its reserved storage space until connectivity is restored.

When certain data are identified as still having priority (alert mode), then another means of communication can be selected, such as a means of communication of the satellite type even if the cost of use and the bandwidth are less suitable for such a transmission.

The alert mode characterizes the fact that an aircraft is faced with one or more critical problems. It is a mode which defines that the communications originating from this aircraft have priority over the other transmissions that are not in this mode.

The alert mode is defined in the aircraft from which the request for connection originates or in the receiving aircraft, for example based on detection of certain predetermined events which may be associated with the detection of critical failures and/or that are associated with worrying flight parameter measurements (for example: predetermined thresholds have been exceeded).

When the data originating from the source aircraft 32 are transmitted to the intermediate aircraft 36 by non-predetermined jumps from the aircraft 32 to the aircraft 34, then from the aircraft 34 to the aircraft 36, then the mechanism that has just been described relating to the aircraft 34 for selecting a next node is also put in place in the aircraft 36.

At the end of this process, the data are retransmitted by a jump from the aircraft 36 to the aircraft 38, which is in this case the final (or terminal) aircraft. It is, moreover, the aircraft of the network that is nearest geographically to the station 46.

The data are then transmitted by the terminal aircraft 38 to the station 46, which in turn retransmits these data to the ground network 48, with which it has a communication link so that the data are transmitted to the control centre 50.

Figure 5:
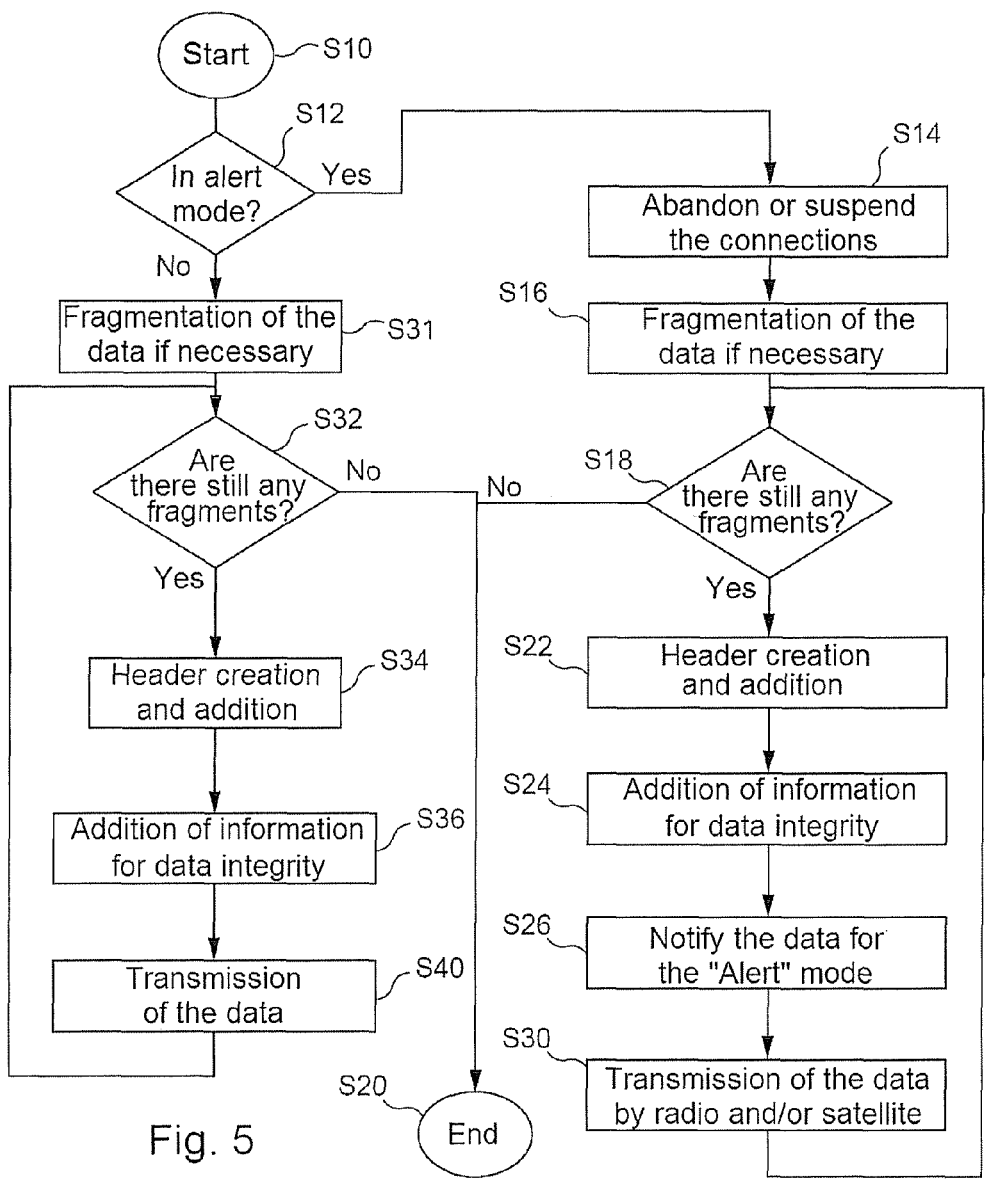
FIG. 5 is an algorithm of a method for transmitting data according to an embodiment of the invention.

FIG. 5 illustrates an algorithm of a method for transmitting data according to the invention.

This algorithm is implemented on board the source aircraft 32 that will transmit data present in its black boxes or recorders, as well as on board the intermediate aircraft 34 and 36.

The algorithm is for example implemented by the unit 16 in FIG. 1 after recovery of data originating from the black boxes or recorders 12 and 14 and/or from the other data source 15.

This algorithm comprises several steps including a first algorithm initialization step, designated S10.

The next step S12 of the algorithm is a test verifying whether the aircraft is in alert mode or not.

This mode can be activated manually or automatically and has the aim of transmitting the data (or certain selected data) contained in the black boxes or originating from the source 15 to an aircraft or to the set of aircraft located nearby (for example the aircraft 34 and 40 in FIG. 2) and forcing the recording by one or more of these aircraft of this zone.

Specifically, the data transmitted by an aircraft in alert mode receive a distinctive marker representing the priority assigned to the transport of these data.

An aircraft in alert mode or transporting the data of an aircraft in alert mode will therefore indicate either its status or the status of the data that it is relaying on establishment of the connection. It will give priority, for its part, to the outgoing communications, and more particularly to the transmission of the most recent priority data. The receiving aircraft that will receive the request for communication with the information on the critical status of the transmitting aircraft will give priority to this aircraft over the communications already established or being established.

Even if this depends on the criteria parametrized for defining the alert mode, it is possible that two aircraft in the same zone are in alert mode or must retransmit priority data. In this case, it is necessary to make it possible for the two transmitters to transmit their data when they have the same level of priority. For this reason, when an aircraft is transporting data in alert mode, it can no longer receive an incoming connection. Thus, it can now only transmit the priority data. The receiving aircraft therefore first tests whether it is in alert mode before accepting, or not accepting, an incoming connection. Thus, in the case of two aircraft within communication (for example radio) range transporting priority data, reception of the data will take place on another aircraft that has a low priority or that does not have any priority data.

It should be noted that the transmission, for the purposes of back-up, of these data is carried out via a means of communication that is selected in relation to a predetermined criterion such as its availability or because it constitutes a preferred means (for example: radio).

However, if this means cannot be used for any reason (for example: unavailability of the means and for example temporary loss of the communications network), then recourse to other means of communication is envisaged for transmission of data as an exception.

For example, another means of communication can be selected automatically as second preferred means (for example: satellite).

As will be seen later with reference to the procedure for reception of the data by a receiving aircraft (node), some of the aircraft detecting information in alert mode are obliged to back up these data as well as the geographical location of the aircraft in difficulty in a back-up storage space.

It is provided that the communication protocol collects information originating from the aircraft in difficulty.

It should moreover be noted that in alert mode, in case of unavailability of the aircraft-to-aircraft communication system (for example there is no aircraft within communication range), the data transmission system of the aircraft in question (for example the aircraft 32 in FIG. 2) may be capable of transmitting data (for example from a black box) via a satellite link, namely to a ground station (gateway or control centre), in order to warn the rescue services as well as the investigation team as early as possible.

When an alert mode is detected, several options can be envisaged.

Firstly, it is possible to provide for a change in the flight plan of an aircraft situated in the geographical zone where the aircraft in difficulty is located, so that the former can follow the latter for as long as possible and collect flight information from this aircraft as well as its position. As provided for by step S14 in FIG. 5, in alert mode it can also be envisaged to suspend or abandon the existing connections with aircraft, except the connections already established from one or more aircraft in alert mode, in order to release the bandwidth. This makes it possible to supply the maximum bandwidth to the aircraft in difficulty and thus optimize the collection of data originating from this aircraft.

It should also be noted that in order to optimize the time for collecting the data originating from the aircraft in difficulty it can be envisaged to broadcast these data in parallel to several aircraft and not just one, or to broadcast these data using several different physical layers (radio, optical, satellite, etc.). In the case of transmission to several aircraft, the data are for example divided into batches that are transmitted separately to several aircraft in parallel. A solution with spectral, frequency or time diversity can be used for this.

When it is decided to transmit outside of the aircraft, for example black box data, the latter are recovered by the means 22 in the storage space 20 in FIG. 1.

The next step S16 provides for fragmenting the data to be transmitted into data packets each constituted of a header and a payload containing the useful data.

This fragmentation is carried out as a function of the physical layer and the communication protocol used.

Every packet is thus transmitted to the same destination.

It should be noted that in the case of broadcasting the data to several aircraft, the same packets are for example transmitted in parallel to all of these aircraft.

The next step S18 is a test making it possible to determine whether there are still data fragments to be transmitted. If there is no fragment awaiting transmission, the algorithm is terminated at step S20.

If there are still fragments to be transmitted, step S18 is then followed by a step S22 consisting of creating and adding a header to the data signal to be transmitted (packet).

The header or headers thus created are useful for data management.

By way of example, it comprises flags or markers indicating the presence of particular data such as data making it possible to identify the aircraft (code).

The algorithm comprises a next step S24 which provides for adding information to the signal to be transmitted in order to guarantee the integrity of the data to be transmitted.

The processing applied to ensure data integrity is that already described with reference to FIG. 1 and carried out by the means 22.

The next step S26 envisages notifying, in the signal to be transmitted, the indication according to which the data to be transmitted originate from an aircraft configured in alert mode. This indication is for example added to the header created in step S22.

The next step S30 provides for transmitting the data in packets over the physical link (either by radio link, or by optical or laser link, or by 4G link, or by satellite link, etc.) as already described above after execution of the algorithm in FIG. 3.

The topology discovery mechanism described with reference to FIG. 3 is suitable for a radio frequency network with mobile nodes as well as for a satellite network and must take performance aspects into account in order to avoid excessive consumption of bandwidth and local resources.

It should be noted in this connection that it is possible to envisage an aircraft wishing to establish a connection, broadcasting a request for connection according to a timer operating periodically or pseudo-periodically.

It is to be noted moreover that establishment of a connection is for example carried out at least in one of the protocol layers.

In the embodiment example, connection is preferably established in a single layer as several connections at different protocol levels increase the complexity of the transmission system and lower its performance.

The connection is established solely at the level of linkage between the two aircraft involved in the transmission. There is no connection from one end to the other of the network.

A very dense radio frequency network such as that of the world fleet of aircraft in flight at a given time (t) must be capable of supporting a very large communication load without altering its operation.

For this purpose, and to avoid possibilities of blocking (for example: saturation of the frequency band) a limit is imposed on the number of connections per aircraft.

Thus, if N denotes the number of outgoing connections, N' the number of incoming connections, M the total number of connections and K the number of back-up locations, then the applicant has established the following relations:

$$N'=N$$

$$M=2 \times N$$

$$K=M+1,$$

the figure "1" denotes a back-up location that is always reserved for storing the data from an aircraft in alert mode.

In the embodiment example, two outgoing connections and two incoming connections are used.

One of the means of communication used for transmitting the data involves a bidirectional radio communications network for transmitting and receiving data between mobile nodes.

Such a network is not necessarily dedicated to the use provided for to implement the invention and can also be used to ensure one or more other functionalities of the aircraft.

The system used is for example a Wi-Fi system or a WiMAX system which supplies the bandwidth, the range (maximum distance over which communication is physically possible) as well as the necessary properties for implementation of the invention (for example it is in particular necessary for the technology to permit provision of the required level of security and management of service quality).

It should be noted that the transmission step S30 is followed by step S18 already described above in order to verify whether there are still data fragments to be transmitted.

Returning to the testing step S12 already described above, when the alert mode is not identified the next step S31 provides for carrying out a fragmentation of the data to be transmitted if necessary.

This step is identical to step S16 already described above.

Step S31 is followed by a testing step S32 making it possible to determine whether there are still data fragments to be transmitted.

If not, this step is followed by step S20 that ends the transmission algorithm.

If so, step S32 is followed by a step S34 which provides for creating and adding one or more headers to the data signal to be transmitted.

This step is identical to step S22 already described above.

The next step of adding information to guarantee data integrity (S36) is identical to step S24 already described above.

The next step S40 provides for transmitting the data configured in the preceding steps over a physical link as already described above in step S30.

The data are thus transmitted to an aircraft that has been previously selected as being the receiving node of the network that is the most suitable for transmission taking into account the predetermined criterion or criteria applied.

In the case where several valid aircraft have been detected, i.e. several aircraft have been selected as meeting one or more predetermined criteria, a first connection is made to the most suitable aircraft among these aircraft.

As a priority, the black box data transmitted to this aircraft are then the most important data in the case of an investigation, i.e. the most recent.

It should be noted that, as far as possible, the data are transmitted in real or quasi-real time, i.e. as these data are acquired by the black box or boxes.

A second connection is for example made to another aircraft selected for transmitting older data, for example those dating from several minutes (for example: t−15 min).

The second connection is for example established with the second "best" pair found during the search for the mobile nodes in the network.

It should be noted that transmission priority is assigned to the data obtained in real time.

Thus, once the physical link is lost or once a better link is detected, the transmission algorithm is executed with the aim of restoring transmission of the data in real time.

This takes place even if this necessitates terminating another active transmission.

Step S40 is then followed by the testing step S32 already described above. It should be noted that the hardware platform used in the transmitting unit 16 in FIG. 1 is for example an open platform of the PC type the confidence level of which is improved by using a cryptographic hardware component, which is for example a TPM (Trusted Platform Module) defined by an organization called TCG (known by the name "Trusted Computing Group").

Figure 6A:
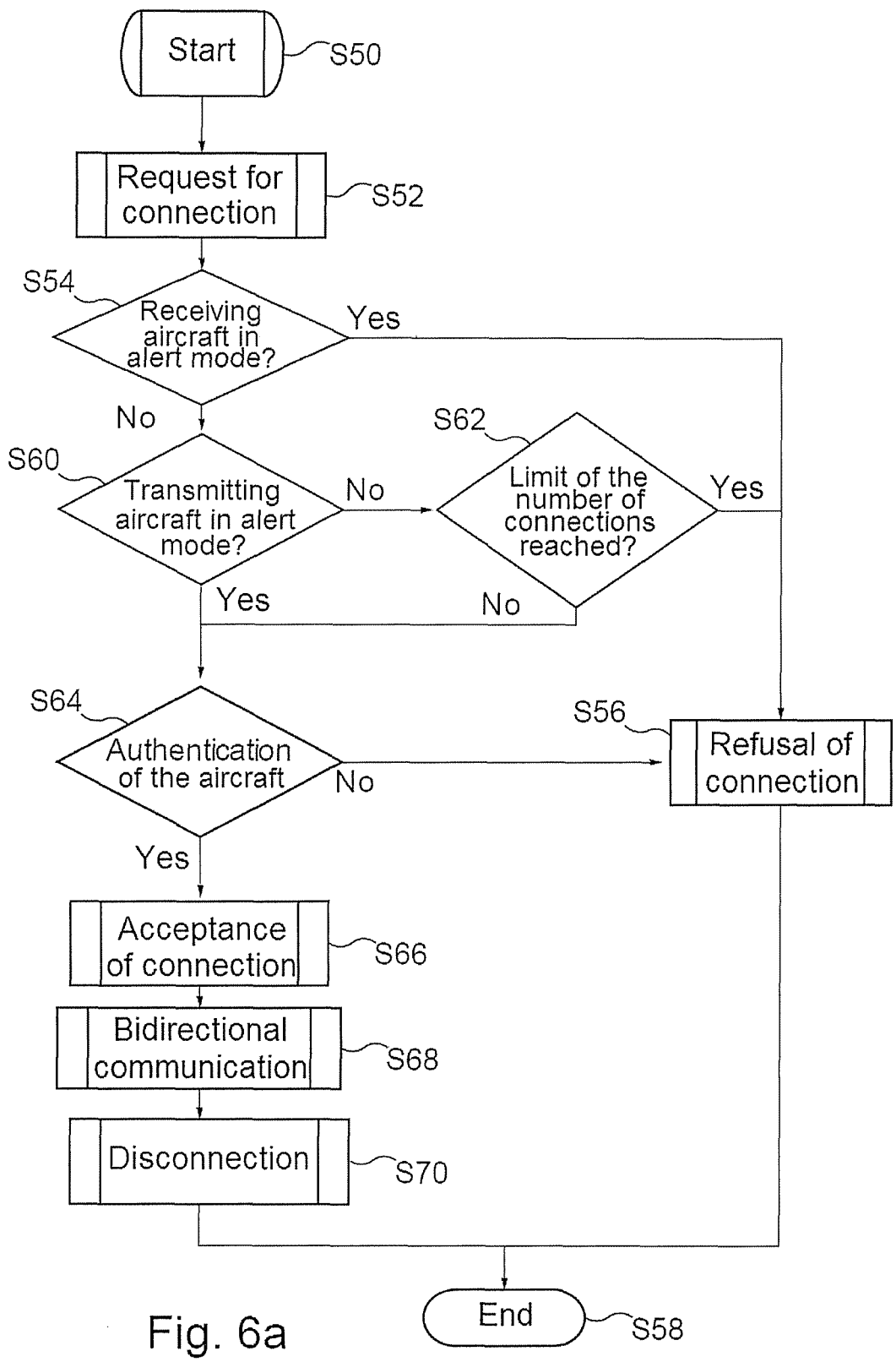
FIGS. 6*a*, 6*b* and 6*c* are respective algorithms of different aspects of a method for receiving data according to the embodiments of the invention.

FIG. 6a represents an algorithm of a part of a method for receiving data according to the invention.

This algorithm is implemented in an aircraft of the mobile network such as that illustrated in FIG. 2 and, for example, in the intermediate aircraft 34 that has been selected by the source aircraft 32 as being the best communication pair.

This algorithm begins with a step S50 of initialization of the algorithm.

This algorithm comprises a step S52 of receiving a request for connection originating from the aircraft 32 and is followed by a testing step S54.

In this step, a test is carried out in order to determine whether the receiving aircraft 34 is in alert mode or not.

If so, connection is refused in step S56 and the algorithm is ended in step S58.

If not, another test is carried out in step S60 in order to determine whether the transmitting aircraft (source aircraft 32) is in alert mode.

The alert mode is thus selected with the aim of prioritizing reception of the black box data transmitted by any mobile node situated in a geographical zone permitting reception of the data.

Returning to step S60, when the result of the test carried out indicates that the aircraft is not configured in alert mode, then a next testing step S62 is carried out.

During this step, it is determined whether the limit on the number of connections (incoming and outgoing) for the receiving aircraft has been reached.

If so, step S62 is followed by steps S56 and S58 already described.

If not, step S62 is followed by a testing step S64, which also follows step S60 when the result of the test is positive.

During step S64, it is determined whether the transmitting aircraft can be authenticated.

If not, step S64 is followed by steps S56 and S58 already described.

If so, the next step S66 aims to accept the request for connection and terminate the other communications in progress (abandon or block the other existing connections between the receiving aircraft 34 and other aircraft).

The next step sets up bidirectional communication between the receiving aircraft 34 and the transmitting aircraft 32. The data transfer in fact requires receiving control frames.

The next step S70 involves disconnection from the transmitting aircraft.

Figure 6B:
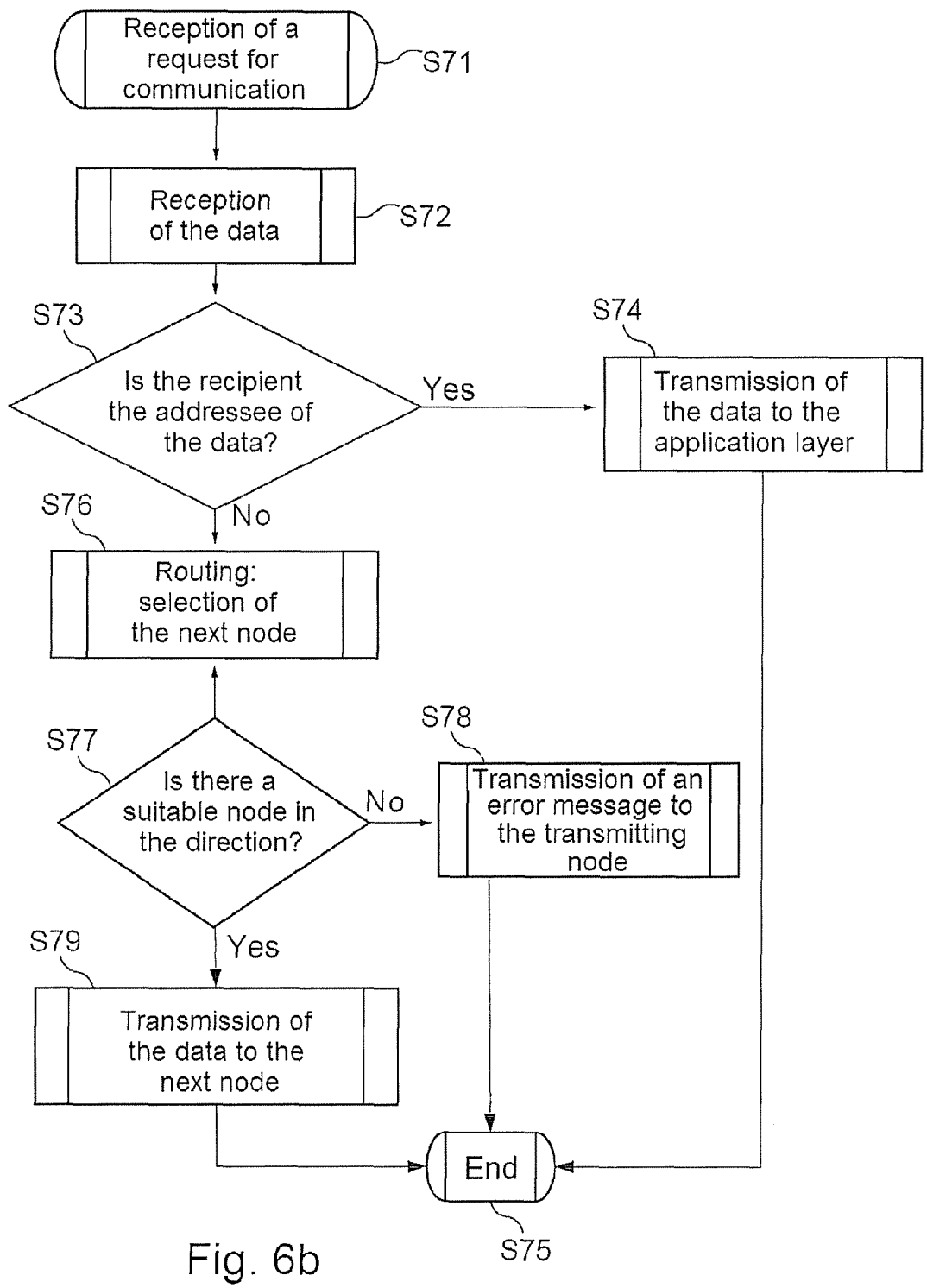

FIG. 6b shows an algorithm of a part of a method for receiving data according to the invention.

This algorithm is implemented in an aircraft of the mobile network such as that illustrated in FIG. 2 and, for example, in the intermediate aircraft 34 that has been selected by the source aircraft 32 as being the best communication pair.

This algorithm begins with a step S71 of receiving a request for communication originating from the transmitting aircraft.

During the next step S72 the data transmitted by the transmitting aircraft are received by the receiving aircraft 34.

The next step S73 is a test, during which it is verified whether the receiving aircraft is the addressee of the data thus received.

If so, the next step S74 provides for transmitting the data to the application layer and the algorithm is terminated with step S75.

Conversely, if the receiving aircraft 34 is not the addressee of the data, then step S73 is followed by a step S76, during which the geographical routing mechanism described above is put in place in order to select the next node to which the data received will be transmitted.

The next step S77 is a test during which it is determined whether there is a node of the network that is located in the direction of the ground station 46 previously identified.

If not, it is provided to transmit an error message to the transmitting aircraft during step S78.

The algorithm is then terminated with step S75.

Conversely, when there is a node situated in the geographical direction of the ground station, step S77 is followed by step S79.

During this last step, the data are transmitted from the aircraft 34, as transmitting aircraft, to the next node selected, namely the intermediate receiving aircraft 36.

The algorithm is then terminated with step S75.

The method described with reference to FIG. 6b will also be put in place in the intermediate aircraft 36 in order to transmit the data to the terminal aircraft 38.

It should be noted that the algorithm in FIG. 6b also applies to the transmission from the final aircraft 38 to the ground station 46 (destination gateway), bearing in mind that the latter is a node of the network.

It should be noted that security measures are put in place in order to guarantee the confidentiality, integrity and provenance of the data that are transferred in the network, from aircraft to aircraft.

In particular, before proceeding with the transfer of the data from a transmitting aircraft to a receiving aircraft, the receiving aircraft is authenticated, and, similarly, the transmitting aircraft is authenticated with respect to the receiving aircraft.

Moreover, data encryption is carried out by the transmitting node in order to guarantee that the intermediate nodes or aircraft (for example the aircraft 34, 36 and 38) do not have access to the data transmitted over the network and that the latter are relaying and also in order to guarantee the integrity of these data.

Moreover, before proceeding to analysis of the data received at network level on the ground, the integrity of these data is verified by a known means.

Figure 6C:
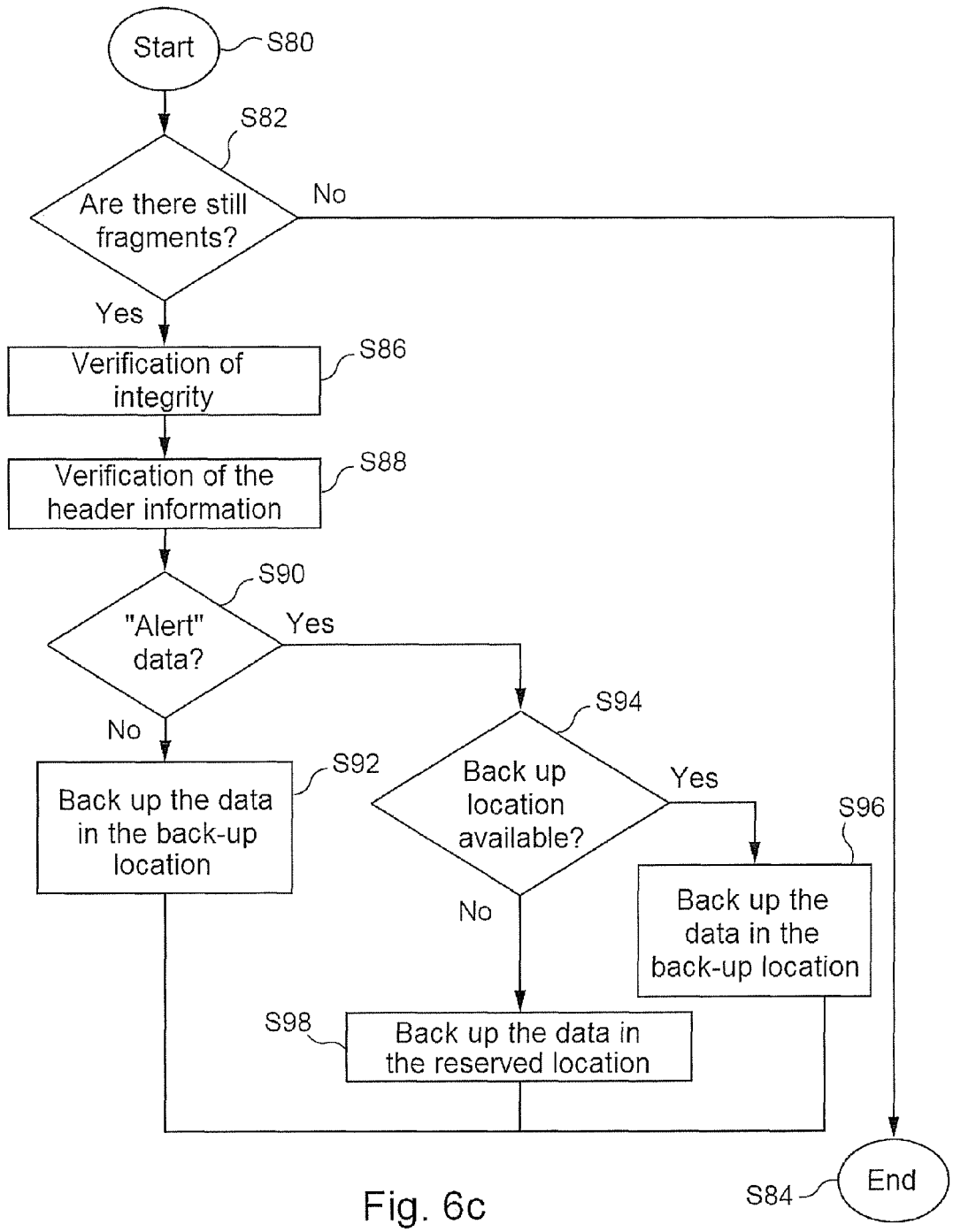

The algorithm in FIG. 6c more particularly gives details of the process for backing-up the data (for example, black box data, or even data originating from another source), collected on board the receiving aircraft selected.

This algorithm begins with an initialization step S80, followed by a testing step S82 verifying whether there are data fragments (packets) to be received.

If not, this step is followed by a step S84 terminating the algorithm.

Conversely, if there are still data fragments to be received, then this step is followed by a step S86 for verification of the integrity of the data received.

The means put in place for checking the integrity of the data are known to a person skilled in the art (e.g. use of a signature for example in MD5 or RSA algorithms). If the data received are not identical to those transmitted, processing is then provided for so that the transmitting aircraft is alerted and therefore the data can be retransmitted.

Step S86 is followed by a step S88 aimed at verifying the information given in the header or headers of the data signal received.

During this step there is in particular optional identification of a marker or flag indicating to the receiving node that the transmitting node is an aircraft in difficulty.

The verification step makes it possible for example to identify other information: identifier of the transmitter, of the receiver, sequence number of the packet etc. This information is useful for organizing and then retrieving the data if necessary.

Step S88 is followed by a testing step S90.

During this step, depending on the result of step S88 it is determined whether the transmitting aircraft from which the data originated (for example black box data) is in alert mode or not.

If not, this step is followed by a step S92 providing for storing the data received in an available storage space (back-up location).

Conversely, when the result of the test carried out in step S90 shows that the data originate from an aircraft in alert mode, this step is followed by a testing step S94.

During this step it is verified whether a storage space is available on board the aircraft. In particular, it is verified whether the conventional storage space is available as a priority to avoid filling the reserved zone.

In the case where a conventional storage space is available, then step S94 is followed by a step S96 providing for storing the data received (for example black box data) in this space (back-up location).

If, conversely, no conventional storage space is available, step S94 is followed by a step S98 providing for backing up the data received in a reserved storage space (dedicated location).

It is thus guaranteed that a specific storage space is available so that it is always possible to receive the data originating from an aircraft in alert mode.

It should be noted that the invention also applies to the transmission of data through a network of aircraft in flight from a ground station (control centre or gateway) as the transmitting source node. This source node transmits for example a request addressed to a destination node. The destination node is one of the aircraft in flight of the network. The data are transmitted to this destination node by taking a path in the network that is not known to the source node but is established, in particular in the aerial part of the network, step by step, before each jump to an intermediate aircraft.

It should be noted that the request sent from the ground can serve as a trigger so that the destination aircraft transmits, in return, a recent version of its data.

When the destination node receives data originating from the ground station (source node) it is thus informed of the existence of this station, which allows it to update or establish on board a list of ground stations.

The invention claimed is:

1. A method for data transmission in a communications network comprising an aircraft in flight and at least one ground station, which constitute communication nodes of the communications network, the method comprising:

selecting, at the aircraft in flight, a destination node; and selecting, at the aircraft in flight, an intermediate node between the aircraft in flight and the destination node in the communications network, wherein the intermediate node comprises an intermediate aircraft, and wherein selecting the intermediate node comprises finding, in response to selecting the destination node, a plurality of aircraft within a communication range of the aircraft in flight and selecting the intermediate aircraft from the plurality of aircraft within the communication range based on the destination node, wherein finding the plurality of aircraft within the communications range comprises performing a radio sweep around the aircraft using a first communication system having a relatively small bandwidth and being used only for controlling communication by detecting nodes and opening and closing communication from a second communication system; and transmitting, using the second communication system, the data at a high rate from the aircraft in flight to the intermediate aircraft for routing to the destination node.

2. The method according to claim 1, wherein the destination node is a ground station.

3. The method according to claim 2, wherein selecting the destination node comprises selecting the ground station from a plurality of ground stations.

4. The method according to claim 3, wherein selecting the ground station comprises selecting a control centre authorized to store the data.

5. The method according to claim 4, wherein selecting the control centre comprises selecting the control centre from a predetermined list of control centres, the predetermined list of control centres being on board the aircraft in flight.

6. The method according to claim 4, wherein selecting the ground station comprises selecting a ground gateway intended to receive the data.

7. The method according to claim 6, wherein selecting the ground gateway comprises selecting the ground gateway:

from a predetermined list of ground gateways, the predetermined list of ground gateways being on board the aircraft in flight, by receiving information originating from ground gateways and signalling the presence of the ground gateways, or by broadcasting a message for finding ground gateway(s) addressed to the aircraft in flight.

8. The method according to claim 6, wherein selecting the ground gateway from the plurality of ground gateways comprises selecting the ground gateway geographically nearest to the aircraft in flight, and wherein the method comprises selecting, before transmitting the data from a transmitting node to at least one receiving node, the at least one receiving node for transmission, based on at least one predetermined criterion, wherein the at least one receiving node that is selected defines a portion of a non-predetermined path without knowledge of a next portion of the non-predetermined path by utilizing the at least one predetermined criterion, wherein the at least one receiving node is selected from a group of receiving nodes that are successively identified by each successive transmitting node, without knowledge of the next portion of the non-predetermined path, after receiving the data from a previous transmitting node.

9. The method according to claim 1, wherein the destination node is an aircraft that is a destination of the data or information.

10. The method according to claim 2, wherein selecting the intermediate node comprises selecting the intermediate aircraft because the intermediate aircraft is in the geographic direction of the ground station.

11. The method according to claim 2, wherein selecting the intermediate node comprises selecting the intermediate aircraft because several aircraft of the plurality of aircraft within the communication range are in a same geographic direction of the ground station and the intermediate aircraft has the smallest relative movement to the aircraft in the flight of the several aircraft.

12. The method according to claim 1, wherein selecting the destination node and the intermediate node comprises selecting the destination node and the intermediate node in response to detecting a critical failure on the aircraft in flight, and wherein transmitting the data comprises transmitting flight data from a black box on the aircraft in flight.

13. A data transmission system in a communications network comprising an aircraft in flight and at least one ground station, which constitute communication nodes of the communications network, wherein the system is onboard the aircraft in flight and wherein the system comprises:
   a transmitter; and
   a hardware platform configured to select a destination node and an intermediate node between the aircraft in flight and the destination node in the communications network, wherein the intermediate node comprises an intermediate aircraft, and wherein selecting the intermediate node comprises finding, in response to selecting the destination node, a plurality of aircraft within a communication range of the aircraft in flight and selecting the intermediate aircraft from the plurality of aircraft within the communication range based on the destination node, wherein the hardware platform is configured to transmit, using the transmitter, the data from the aircraft in flight to the intermediate aircraft for routing to the destination node, and wherein the destination node is a ground station, and wherein selecting the intermediate node comprises selecting the intermediate aircraft because the intermediate aircraft is in the geographic direction of the ground station.

14. The system according to claim 13, wherein finding the plurality of aircraft within the communications range comprises performing a radio sweep around the aircraft.

15. The system according to claim 13, wherein selecting the destination node comprises selecting the ground station from a plurality of ground stations constituting nodes of the communications network.

16. The system according to claim 13, wherein the hardware platform is configured for transmitting a distinctive priority marker with the flight data from the black box on the aircraft in flight, and wherein the hardware platform is configured for selecting, before transmitting the data from a transmitting node to at least one receiving node, the at least one receiving node for transmission, based on at least one predetermined criterion, wherein the at least one receiving node that is selected defines a portion of a non-predetermined path without knowledge of a next portion of the non-predetermined path by utilizing the at least one predetermined criterion, wherein the at least one receiving node is selected from a group of receiving nodes that are successively identified by each successive transmitting node, without knowledge of the next portion of the non-predetermined path, after receiving the data from a previous transmitting node.

17. The system according to claim 13, wherein selecting the destination node and the intermediate node comprises selecting the destination node and the intermediate node in response to detecting a critical failure on the aircraft in flight, and wherein transmitting the data comprises transmitting flight data from a black box on the aircraft in flight and transmitting a distinctive priority marker with the flight data from the black box on the aircraft in flight.

* * * * *